United States Patent Office 3,278,394
Patented Oct. 11, 1966

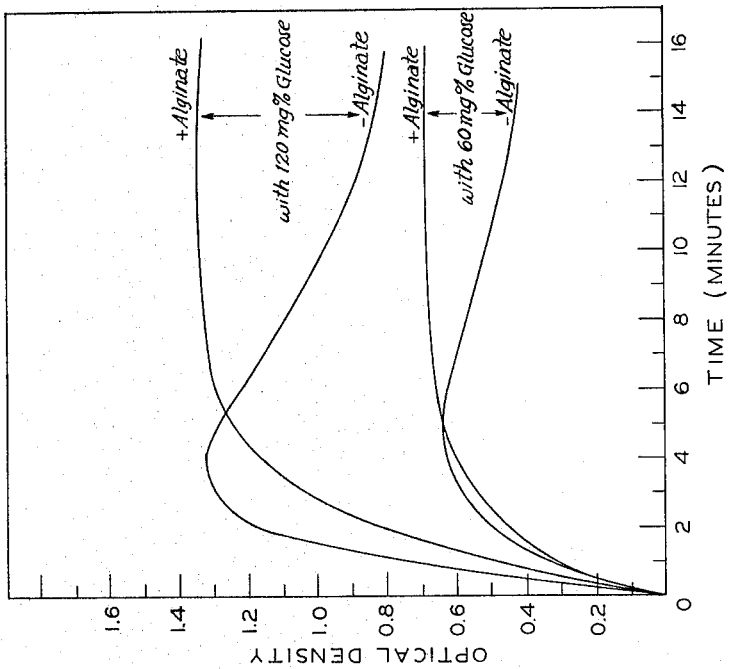
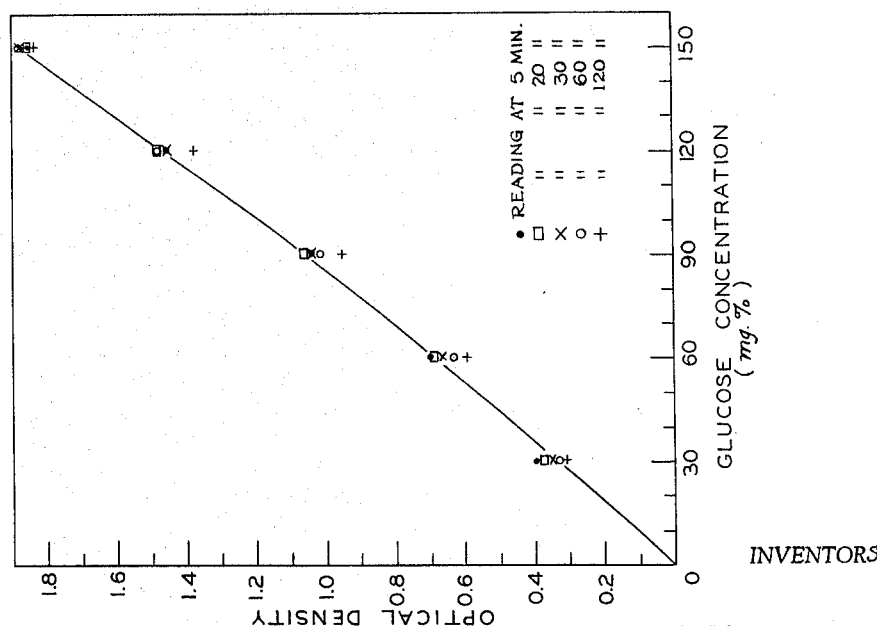

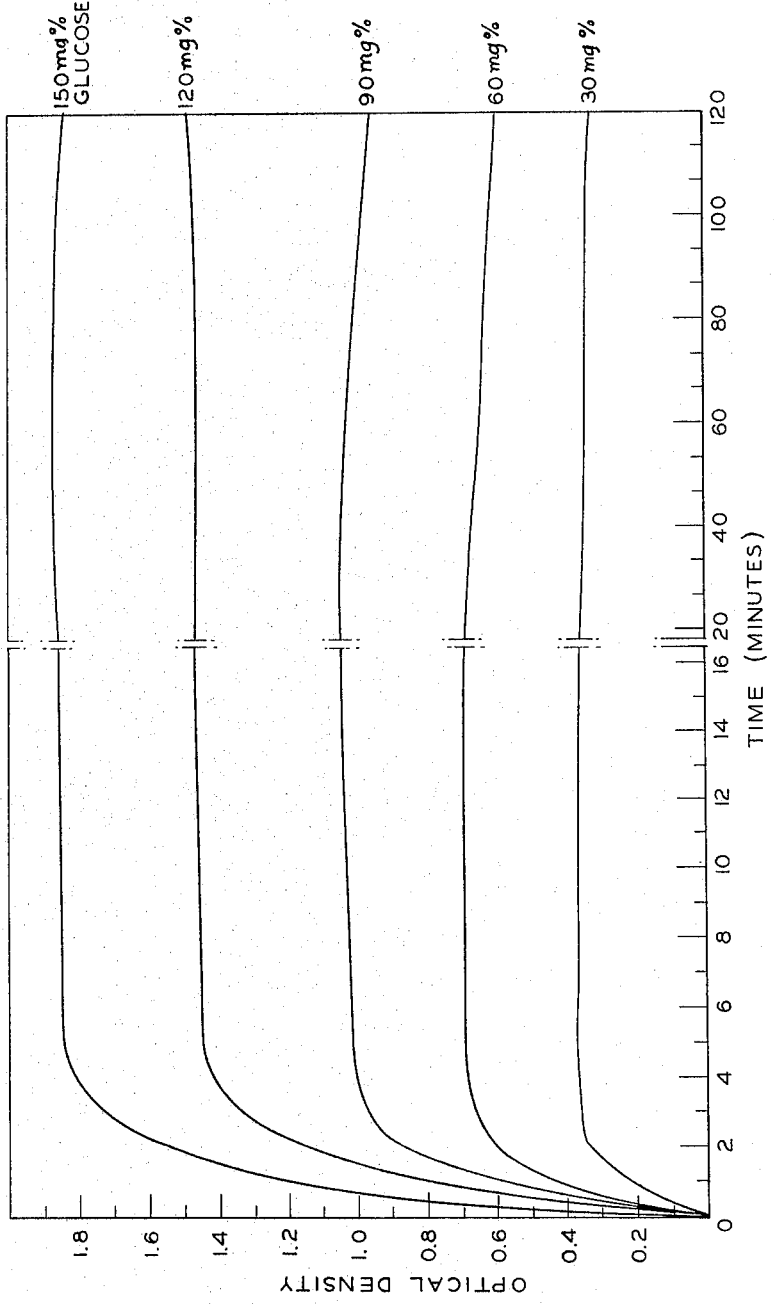

3,278,394
METHOD AND COMPOSITION FOR DIAGNOSING GLUCOSE
Edward K. Harvill and Edmond Chiu-Choon Ku, Elkhart, Ind., assignors to Miles Laboratories, Inc., Elkhart, Ind., a corporation of Indiana
Filed July 22, 1963, Ser. No. 296,718
5 Claims. (Cl. 195—103.5)

This invention relates to an improved diagnostic composition and particularly to a diagnostic composition useful in the quantitative determination of glucose in blood. More particularly, this invention is concerned with an improved liquid test system for accurately measuring the amount of glucose present in blood.

The quantitative determination of glucose in blood is of importance not only to the diabetic patients who must control their sugar intake, but also to the testing of large numbers of people to determine the incidence of diabetes among them. A simple, rapid, convenient and reliable test for detecting glucose in blood is of tremendous importance as an aid in the detection of this disease.

There are a number of tests, techniques and methods known which can be and are being used to measure or estimate the amount of glucose in blood. The more widely used of the conventional procedures are based on the use of alkaline copper solutions which are heated with the materials being tested to precipitate cuprous oxide where there is present a reducing sugar.

More recently a variety of reagents and techniques have been used or proposed which offer advantages over these older methods in that there is no heating requirement, require a great deal less skill to operate, and in general provide the advantages of less cumbersome equipment, ease and simplicity of test procedure, ease of disposal of test devices and rapidity of test procedure, to mention a few. A number of the recently developed reagents and techniques involve the use of two enzymes and an indicator, which indicator is oxidized by hydrogen peroxide in the presence of peroxidase and undergoes a color reaction during such oxidation. In one particular reagent formulation for use in glucose determination comprises glucose oxidase, peroxidase, orthotolidine dihydrochloride, a buffer and gelatin as set forth, for example, in U.S. Patent No. 2,848,308 to Alfred H. Free, issued August 19, 1958, and assigned to the assignee of the present application. Gelatin was incorporated into the composition because it was found that its use resulted in the production of deep, sharply defined color, as distinguished from more poorly defined or inconclusive color which was produced by the same compositions in the absence of the gelatin.

An improvement over the foregoing test composition was described and claimed in U.S. Patent No. 2,912,309 to Helen M. Free, issued November 10, 1959, and assigned to the assignee of the present application. It was discovered by the patentee that incorporation of a soluble protein served as a stabilizing agent making the glucose oxidase-peroxidase indicator stable to such destructive influences as are brought about by heat, light and air; thus imparting to the compositions greater shelf life. The protein also functioned as an adhesive facilitating adherence of the active ingredients to, for example, a bibulous strip or stick, in the production of a simple "dip and read" test device.

While the foregoing discussed patents have contributed greatly to the advancement of the art of diagnosing diabetes and other disturbances of metabolism evidenced by the presence of elevated glucose level in the urine, and the advances made have been worthwhile, none has completely solved the problem of developing a simple economical test for the quantitative determination of glucose in blood which not only produces rapid maximum color development, but also is characterized by its ability to maintain that color development at maximum values for an extended period of time.

In accordance with this invention, an improved diagnostic composition for the quantitative determination of glucose in blood is provided which offers the advantage of an extremely rapid color development and the maintenance of maximum color value for extended periods of time, for example up to about two hours, as compared with a maximum of about seven minutes for the prior art compositions.

The maintenance of maximum color development for extended periods of time is extremely important for the reason that it allows the technician to perform a whole series of tests and read them for maximum color development without being pressed for time. More precise assays are thus possible because the maximum color development does not have to be read at a precise and substantially inflexible time, as is required in the use of previously known glucose diagnostic test systems. One of the more important advantages of applicants' invention is that because of the color stability provided, the reuslts may be rechecked, which rechecking heretofore has been substantially impossible using the known diagnostics. Additional advantages offered by the improved stability of the color developed by compositions of the present invention are that it allows time for more accurate comparison of the developed color with a color chart, and it also allows time for gradation of samples against each other directly. Such direct gradation is, of course, impossible, when previously known diagnostic compositions are used, because of the shortness of the time during which the maximum color developed thereby can be maintained.

Broadly, the composition of this invention comprises the enzyme glucose oxidase, an indicator oxidizable to produce an observable color change, an activator material capable to catalyzing the oxidation of said indicator in the presence of hydrogen peroxide, and a protective colloid effective to stabilize the color produced by oxidation of said indicator. Glucose oxidase catalyzes the conversion of glucose to gluconic acid and hydrogen peroxide in the presence of atmospheric oxygen. The preferred activator material is the enzyme peroxidase. A buffer is also preferably used to maintain the pH of the reactants at the site of reaction within the optimum range as hereinafter described.

The composition of this invention may be prepared as a suspension or a solution and lyophilized, or it may be mixed dry and ground. In the latter case the ingredients are ground in the ratio desired in a mortar or other appropriate container allowing for good refining and mixing of the ingredients. The powder is then weighed into a vial in the quantity desired and the vial is capped for storage. In the former case, lyophilization may readily be accomplished at temperatures of about from 0° C. to −20° C.

As the color indicator there may be used any material which is oxidized in the presence of a peroxide and a catalytic activating substance, and which will undergo an observable color change such that the opitcal density of the indicator is proportional to the glucose concentration in the blood specimen being tested. FIGURE 1 shows this relationship graphically using ortho-tolidine as the indicator and sodium alginate as the protective colloid. Other indicators which may be used include, for example, bendidine, gum guaiac, 2,7-diaminofluorene, o-dianisidine, leucoindophenols, 3,4-dihydroxyphenylalanine and guaiacol. Of these ortho-tolidine is preferred.

Various buffers may be used to provide the preferred pH range of from about pH 4.2 to about pH 4.8. At lower pH's enzymes are susceptible to denaturation, whereas at higher pH's optimum color development is not realized. For example, when using ortho-tolidine as the indicator, a pH of above about 4.8 causes the color to develop as a greenish hue rather than a blue, and slight turbidity may be observed as well. Buffers which may be used include, for example, citrate, acetate, phosphate and tricarballylate as well as the tris buffers. These buffers are salts of organic acids with the amine tris (hydroxymethyl) aminomethane. They include among others tris (hydroxymethyl) methylamine citrate, sometimes called tris-citrate, tris-tricarballylate, tris-propionate, tris-formate, tris-lactate, tris-malonate, tris-gluconate, tris-glucuronate, tris-succinate, tris-tartrate and tris-aconitate. Although tris-phosphate does not satisfy the requirement of being an amine salt of an organic acid tris (hydroxymethyl) methylamine phosphate may be used similarly.

The protective colloid of this invention may be any of a number of materials so characterized. For example, sodium alginate, gum arabic, gelatin, bovine serum albumin, carboxymethyl cellulose, agar or Carbowax have all been used satisfactorily to a greater or lesser extent. Of these sodium alginate and gum arabic have been found to give unexpectedly superior results and are therefore the preferred protective colloids of this invention.

The operative range of concentration of sodium alginate and gum arabic was found to be from 0.5 mg to 10.0 mg. per unit test of about 24.0 mg., and the optimum concentration of these protective colloids was found to be about 1.0 mg. per unit test of about 24.0 mg.

The following examples will illustrate the improved diagnostic composition of the invention, the scope of the invention not, however, being limited to the specific details of the examples.

EXAMPLE 1

A mixture was prepared containing:

|  | Mg. |
|---|---|
| Citric acid | 8.64 |
| Sodium citrate | 13.23 |
| Peroxidase | 0.06 |
| Orthotolidine·2HCl | 0.30 |
| Glucose oxidase | 1.00 |
| Sodium alginate | 1.00 |

These ingredients were mixed dry and ground to insure thorough mixing. The resulting mixture was then placed in a vial and capped until use.

EXAMPLE 2

By way of illustration of the rapid maximum color development and the maintenance of the maximum color value for an extended period of time, aqueous glucose solutions containing 40 and 80 mg. percent glucose were prepared and tested utilizing the composition prepared in accordance with Example 1. The vial contents were dissolved in 6 ml. of water and 3 ml. of the glucose solutions added to the test solution. After mixing, the color of the solution was read by means of a spectrophotometer at 6200 Angstroms for a total period of 1 hour. The results of this test are shown in Table I.

Table I

| Time (min.) | O.D. at 6,200 Angstroms | |
|---|---|---|
|  | 40 mg., percent | 80 mg., percent |
| 1 | 0.173 | 0.430 |
| 2 | 0.257 | 0.562 |
| 3 | 0.357 | 0.618 |
| 4 | 0.413 | 0.722 |
| 5 | 0.438 | -------- |
| 6 | 0.450 | -------- |
| 7 | 0.452 | 0.865 |
| 8 | 0.452 | 0.886 |
| 9 | -------- | 0.900 |
| 10 | -------- | 0.900 |
| 60 | -------- | 0.840 |

From the data reported in Table I, it is clearly seen that the diagnostic composition of this invention provides extremely rapid maximum color development and the maintenance of the color value for an extended period of time.

In stark contrast to this maintenance of true color value, FIGURE 2 shows a comparison between the test compositions of this invention utilizing sodium alginate as a protective colloid to stabilize color development and compositions which are otherwise the same but lack the protective colloid.

That the color maintenance is observed throughout the range of glucose concentrations encountered in testing blood, for example capillary blood from the fingertip, may be clearly observed by reference to FIGURE 3, which shows uniform color maintenance at all glucose concentrations from 30 mg. percent to 150 mg. percent as a result of the use of sodium alginate in the test composition.

It is obvious that other changes may be made in the above composition and methods without departing from the spirit and scope of the invention, and it is therefore intended that all matter contained in the foregoing description should be interpreted as illustrative and not in a limiting sense. It is also understood that other modifications may be made without departing from the spirit and scope of the appended claims.

What is claimed is:

1. A test composition for adding to and accurately detecting glucose in aqueous solution which consists of, in said aqueous solution, glucose, oxidase, peroxidase, a color indicator which is oxidized in the presence of a peroxide and perxoidase to produce an observable color change, a buffer for effecting a pH of from about 4.2 to about 4.8 at the reaction site when the test composition is contacted with material to be tested, and as a protective colloid effective to stabilize the color produced by oxidation of said indicator, sodium alginate.

2. The test composition of claim 1 in the form of a powder.

3. The test composition of claim 2 in the form of a lyophilized powder.

4. A method for accurately and quantitatively detecting glucose in solution which comprises adding an aqueous solution of a test composition consisting of glucose oxidase, peroxidase, a color indicator which is oxidized in the presence of a peroxide and peroxidase to produce an observable color change, a buffer for effecting a pH of from about 4.2 to about 4.8 in said solution and sodium alginate to said glucose solution and thereafter determining the amount of color formed in said solution which is indicative of the concentration of glucose present.

5. The method of claim 4 wherein the color formed is determined using a spectrophotometer.

References Cited by the Examiner

UNITED STATES PATENTS

| 2,848,308 | 8/1958 | Free | 195—103.5 |
| 2,912,309 | 10/1959 | Free | 195—103.5 |
| 3,042,496 | 7/1962 | Francher et al. | 195—103.5 |
| 3,066,081 | 11/1962 | Rorem et al. | 195—103.5 |
| 3,092,465 | 6/1963 | Adams et al. | 195—103.5 |
| 3,123,443 | 3/1964 | Smeby | 195—103.5 X |

OTHER REFERENCES

Rose: The Condensed Chemical Dictionary, 1956, Reinhold Pub. Co., New York, pp. 36 and 37.

A. LOUIS MONACELL, *Primary Examiner.*

A. E. TANENHOLTZ, *Assistant Examiner.*